(12) United States Patent
Zauner et al.

(10) Patent No.: US 12,033,210 B2
(45) Date of Patent: Jul. 9, 2024

(54) OPTIMIZING LOAN OPPORTUNITIES IN A LOAN ORIGINATION COMPUTING ENVIRONMENT

(71) Applicant: MeridianLink, Inc., Costa Mesa, CA (US)

(72) Inventors: Wesley Prescot Zauner, Mission Viejo, CA (US); Timothy Nguyen, Fountain Valley, CA (US); Christopher Thomas Maloof, Huntington Beach, CA (US)

(73) Assignee: MeridianLink, Inc., Costa Mesa, CA (US)

( * ) Notice: Subject to any disclaimer, the term of this patent is extended or adjusted under 35 U.S.C. 154(b) by 129 days.

(21) Appl. No.: 17/566,345

(22) Filed: Dec. 30, 2021

(65) Prior Publication Data

US 2022/0292596 A1  Sep. 15, 2022

Related U.S. Application Data

(63) Continuation of application No. 17/195,851, filed on Mar. 9, 2021, now Pat. No. 11,250,505.

(51) Int. Cl.
| | |
|---|---|
| *G06Q 40/03* | (2023.01) |
| *G06F 3/0482* | (2013.01) |
| *G06Q 30/0282* | (2023.01) |

(52) U.S. Cl.
CPC .......... *G06Q 40/03* (2023.01); *G06F 3/0482* (2013.01); *G06Q 30/0282* (2013.01)

(58) Field of Classification Search
CPC ... G06Q 40/03; G06Q 30/0282; G06F 3/0482

(Continued)

(56) References Cited

U.S. PATENT DOCUMENTS

| | | | |
|---|---|---|---|
| 6,901,384 B2 * | 5/2005 | Lynch | G06Q 40/08 705/38 |
| 7,107,241 B1 * | 9/2006 | Pinto | G06Q 40/03 705/38 |

(Continued)

OTHER PUBLICATIONS

Andrews et al., "Computer program speeds mortgage loan process", Colorado Springs Gazette—Telegraph, Colorado Springs, Proquest Document Id: 268078863, Jun. 5, 1994.*

(Continued)

*Primary Examiner* — Frantzy Poinvil
(74) *Attorney, Agent, or Firm* — Thomas | Horstemeyer, LLP

(57) ABSTRACT

In one or more embodiments, one or more loan origination systems can obtain, from a credit reporting system, credit report data for a mortgage loan applicant. The one or more loan origination systems can determine that the mortgage loan applicant does not qualify for a mortgage loan product based on the credit report data obtained from the credit reporting system. The one or more mortgage loan origination systems can obtain data representing a non-mortgage loan product for which the mortgage loan applicant qualifies based on the credit report data. The one or more loan origination systems can generate a modified version of the mortgage loan applicant's credit report data based on the non-mortgage loan product and determine that the mortgage loan applicant would qualify for the mortgage loan product based on the modified version of the credit report data.

22 Claims, 8 Drawing Sheets

(58) Field of Classification Search
USPC ..................................................... 705/3–44
See application file for complete search history.

(56) References Cited

U.S. PATENT DOCUMENTS

| | | | | |
|---|---|---|---|---|
| 7,873,569 | B1* | 1/2011 | Cahn | G06Q 40/04 705/37 |
| 7,987,124 | B1* | 7/2011 | Holden | G06Q 40/00 705/40 |
| 8,423,451 | B1 | 4/2013 | Flaxman et al. | |
| 8,433,650 | B1* | 4/2013 | Thomas | G06Q 40/02 705/38 |
| 8,489,498 | B1 | 7/2013 | Flaxman et al. | |
| 8,909,551 | B2 | 12/2014 | Pawlusiak et al. | |
| 9,704,107 | B1 | 7/2017 | Baker, IV et al. | |
| 2002/0059137 | A1* | 5/2002 | Freeman | G06Q 40/03 705/38 |
| 2003/0212628 | A1 | 11/2003 | Kuttan et al. | |
| 2006/0248003 | A1 | 11/2006 | Basin et al. | |
| 2006/0259420 | A1* | 11/2006 | Schaffer | G06Q 20/10 705/40 |
| 2007/0192209 | A1 | 8/2007 | Ronan et al. | |
| 2007/0288361 | A1 | 12/2007 | Martignoni | |
| 2008/0091581 | A1 | 4/2008 | Kremen | |
| 2009/0063328 | A1 | 3/2009 | Cuscovitch et al. | |
| 2010/0145859 | A1 | 6/2010 | Murakami et al. | |
| 2010/0211494 | A1 | 8/2010 | Clements | |
| 2012/0158573 | A1* | 6/2012 | Crocker | G06Q 40/02 705/38 |
| 2015/0161726 | A1 | 6/2015 | Pawlusiak et al. | |
| 2015/0379632 | A1* | 12/2015 | Michael | G06Q 40/03 705/38 |
| 2016/0140654 | A1* | 5/2016 | Bhat | G06Q 10/06316 705/7.26 |
| 2018/0082372 | A1 | 3/2018 | Diana | |
| 2019/0333142 | A1* | 10/2019 | Thomas | G06F 16/27 |
| 2020/0090264 | A1 | 3/2020 | OBrien | |
| 2020/0294128 | A1* | 9/2020 | Cella | H04L 9/3239 |

OTHER PUBLICATIONS

Fay, Bill, How to Get a Mortgage, Debt.org, Accessed Dec. 23, 2020, Retrieved from the Internet: https://www.debt.org/real-estate/mortgages/.

Randall, Lucy, Lowering your debt to income ratio (DTI) when applying for a mortgage, Better, Accessed Dec. 23, 2020, Retrieved from the Internet: https://better.com/content/improving-your-debt-to-income-ratio-dti-when-applying-for-a-mortgage/.

Digital Lending Amplified, brochure by Meridian Link, 2021, Costa Mesa, CA.

Consumer Credit Report, Equifax, Accessed Mar. 15, 2021, Retrieved from the Internet: https://developer.equifax.com/products/consumer-credit-report.

Meridian Link Consumer: Premier Loan Origination System, brochure by Meridian Link, 2021, Costa Mesa, CA.

Meridian Link Consumer, Meridian Link Opening: The Industry's First Complete Origination Platform for Deposits and Lending Across All Channels, brochure by Meridian Link, 2021, Costa Mesa, CA.

The State of Loan Origination Software, brochure by Meridian Link, 2020, Costa Mesa, CA.

Credit Card Market Monitor, American Bankers Association, Feb. 2020, https://www.aba.com/—/media/documents/reports-and-surveys/2019-q3-credit-card-monitor.pdf?rev=9c1664304c9149a8a08e6d146791126f&hash=7C3DFC79780D314CBAC7A6FDA7C31159.

Tatham, Matt, Experian Personal Loan Study: Personal Loan Debt Continues Fast-Paced Growth, Experian, Oct. 14, 2019, https://web.archive.org/web/20191219053035/https://www.experian.com/blogs/ask-experian/research/personal-loan-study/.

Zabritski, Melinda, As Average Auto Loan Amounts Continue to Increase, Consumers Look to Manage Monthly Payments, Experian, Sep. 23, 2019, https://www.experian.com/blogs/insights/2019/09/average-auto-loan-amounts-continue-increase-consumers-look-manage-monthly-payments/.

Credit Union National Association (CUNA), CUNA U.S. Membership Benefits Report, Third Quarter 2019, https://www.cuna.org/uploadedFiles/Global/About_Credit_Unions/National-MemberBenefitsS19.pdf.

Goodman et al., Understanding Changes in Household Debt by Credit Risk Category: The Role of Credit Score Transitions, Board of Governors of the Federal Reserve System, Jun. 25, 2019, https://www.federalreserve.gov/econres/notes/feds-notes/the-role-of-credit-score-transitions-20190625.htm.

Hunt, William, Credit Union Decade In Review, Callahan & Associates CreditUnions.com, Sep. 30, 2019, https://creditunions.com/blogs/graphic-of-the-week/credit-union-decade-in-review/.

What's Going on in Banking 2020, Cornerstone Advisors, https://www.cmrstone.com/publications/whats-going-on-in-banking-2020-2/.

Rise of the Credit Unions, Insights by Stratmor Group, Oct. 2018, https://www.stratmorgroup.com/insights_article/rise-of-the-credit-unions/.

Britt, Phillip J., Completing the puzzle: Banks link mortgage origination to automated underwriting technology, Publication info: Community Banker 12.6: 30-35, America's Community Bankers, Jun. 2003.

Betancourt et al., Accounting for troubled debt structurings: accounting and regulatory reporting rules applicable to modification of loans held in portfolio, Bank Accounting & Finance 22.1 19(7). CCH, Inc. Dec. 2008.

* cited by examiner

Mortgage Origination System > Mortgage Products

Mortgage Products Currently Available to Applicant

| Product | APR | Fees | Monthly Payment |
|---|---|---|---|
| 30-year fixed-rate | 4.00% | $1,200 | $954 |
| 30-year fixed rate | 3.50% | $5,200 | $898 |
| 30-year fixed rate | 3.25% | $6,200 | $876 |

Mortgage Products Available If Applicant Makes Changes

Refinancing applicant's existing auto loan with Auto Bank would make these mortgage products available:

| Product | APR | Fees | Monthly Payment |
|---|---|---|---|
| 30-year fixed-rate | 3.80% | $1,150 | $933 |
| 30-year fixed rate | 3.30% | $5,150 | $876 |
| 30-year fixed rate | 3.05% | $6,150 | $849 |

| Existing Auto Loan | Refinance Offer |
|---|---|
| $377/month 23 months remaining | $94/month 60 months |

Credit score would increase by about 5 points
Debt-to-income ratio would lower by about 4%

[Apply]

OPTIMIZING LOAN OPPORTUNITIES IN A LOAN ORIGINATION COMPUTING ENVIRONMENT

CROSS-REFERENCE TO RELATED APPLICATION

This application is a continuation of and claims priority to U.S. patent application Ser. No. 17/195,851 entitled "OPTIMIZING LOAN OPPORTUNITIES IN A LOAN ORIGINATION COMPUTING ENVIRONMENT," filed on Mar. 9, 2021, the entire content of the application being incorporated herein by reference in its entirety.

BACKGROUND

When a lender receives an application for a mortgage loan product, an underwriter usually reviews the application to assess the level of risk in lending money to the applicant. An underwriter may consider, for example, the applicant's credit score, debt-to-income ratio, and information about the subject property to determine whether the level of risk is acceptable to the lender. If the underwriter determines that the risk level is acceptable, the lender may approve the application for the mortgage loan.

For the computers and networks involved in the mortgage loan application process, data security and privacy are critical. As such, institutions providing computing systems, resources, and services used in the mortgage loan process generally implement policies and systems to protect resources and data. However, the systems and policies that are intended to protect resources and data can sometimes impede the loan application process.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 7 is an example of a user interface encoded by the mortgage loan origination system and rendered in a display of a client device of the networked environment of FIG. 1 according to various embodiments.

DETAILED DESCRIPTION

The present disclosure relates to computing systems that can facilitate a loan applicant qualifying for a loan by modifying one or more of the applicant's existing debts, while maintaining the computing systems' existing data security and privacy safeguards. In one example, a mortgage loan origination system can determine that a mortgage loan applicant does not qualify for a particular mortgage loan product. However, in accordance with various embodiments described below, the mortgage loan origination system can interact with a non-mortgage loan origination system and determine that the applicant would qualify for the mortgage loan product if the applicant modified preexisting debts by, for example, refinancing or consolidating the debts using non-mortgage loan products. The mortgage loan origination system can also provide loan application data to the non-mortgage loan origination system in order to facilitate the application process for the non-mortgage loan products.

In some lender computing systems, mortgage loan origination systems are partitioned from non-mortgage loan origination systems as a way of further protecting data privacy and security. In such architectures, a user (e.g., a loan officer) of the mortgage loan origination system may not have access to the non-mortgage loan origination system, which can impede the loan application processes. However, by having the mortgage loan origination system facilitate communications and the transfer of application information to the non-mortgage loan origination system, various embodiments of the present disclosure overcome these problems and can improve the functionality of a computing environment having a mortgage loan origination system and a non-mortgage loan origination system.

In the following discussion, examples of systems and their components are described, followed by examples of the operation of those systems.

Figure 1:
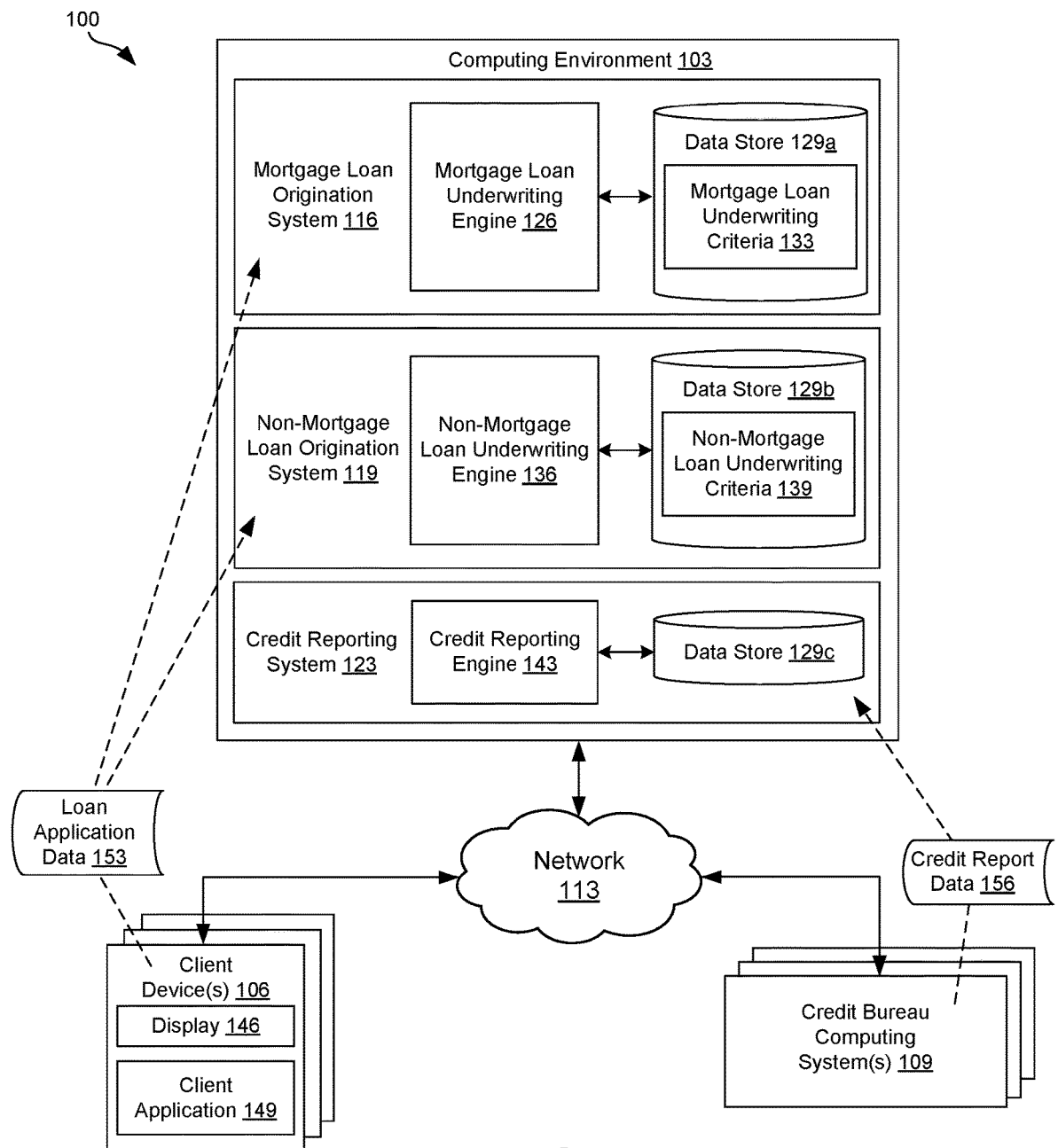
FIG. 1 is a drawing of an example of a networked environment according to various embodiments of the present disclosure.

With reference to FIG. 1, shown is an example of a networked environment 100 according to various embodiments of the present disclosure. The networked environment 100 can include a computing environment 103, one or more client devices 106, and one or more credit bureau computing systems 109 in data communication through a network 113. The network 113 can include the Internet, one or more intranets, extranets, wide area networks (WANs), local area networks (LANs), wired networks, wireless networks, or any combination of two or more networks. For example, the network 113 can include satellite networks, cable networks, Ethernet networks, and telephony networks.

In one or more embodiments, the computing environment 103 can be a computing platform operated and maintained by a financial institution or by an entity that provides services for a financial institution. The computing environment 103 can include one or more computing devices, such as a server computer, that provides computing capabilities. Alternatively, the computing environment 103 can include multiple computing devices arranged in one or more server banks or computer banks. Such computing devices can be located in a single installation, or the computing devices can be distributed among multiple different geographical locations.

In some embodiments, the computing environment 103 can include computing devices that together form a hosted computing resource or a grid computing resource. Additionally, the computing environment 103 can operate as an elastic computing resource for which the allotted capacity of computing-related resources, such as processing resources, network resources, and storage resources, can vary over time. Moreover, the computing environment 103 can include and/or be operated as one or more virtualized computer instances that perform the functionality described herein.

The computing environment 103 can include various systems. For example, the computing environment 103 can include a mortgage loan origination system 116, a non-mortgage loan origination system 119, and a credit reporting system 123. The mortgage loan origination system 116 can be a system that facilitates the processing and approval of mortgage loan applications, and the non-mortgage loan origination system 119 can be a system that facilitates the processing and approval of non-mortgage loan applications. Examples of non-mortgage loans can include any loan that is not a mortgage, such as automobile loans and personal installment loans (e.g., debt consolidation loans). In one or more embodiments, non-mortgage loans may be referred to as "consumer loans."

The mortgage loan origination system 116 can include a mortgage loan underwriting engine 126 and a data store 129*a*. The data store 129*a* can contain mortgage loan underwriting criteria 133, which the mortgage loan underwriting engine 126 can use to determine whether an applicant qualifies for one or more mortgage loan products. According to various embodiments, the mortgage loan underwriting criteria 133 can be based on or include, for example, data representing an applicant's credit score, debt-to-income ratio, employment history, credit payment history, assets, and information regarding the property that would be subject to the mortgage loan. The mortgage loan underwriting criteria 133 can be set by the financial institution for which the mortgage loan origination system 116 processes mortgage loan applications.

In some embodiments, the mortgage loan underwriting engine 126 can make underwriting decisions without further input from a user affiliated with the lender. In other embodiments, the mortgage loan underwriting engine 126 can make a preliminary underwriting decision, which must then be subsequently reviewed for final approval by a loan officer or other affiliate of the lender.

To facilitate communication with other devices and systems, the mortgage loan origination system 116 can provide an application programming interface (API). For example, client devices 106 and the non-mortgage loan origination system 119 can communicate with the mortgage loan origination system 116 using the API.

The non-mortgage loan origination system 119 can include a non-mortgage loan underwriting engine 136 and a data store 129*b*. The data store 129*b* can contain non-mortgage loan underwriting criteria 139, which the non-mortgage loan underwriting engine 136 can use to determine whether an applicant qualifies for one or more non-mortgage loan products. According to various embodiments, the non-mortgage loan underwriting criteria 139 can be based on or include, for example, data representing an applicant's credit score, debt-to-income ratio, employment history, credit payment history, assets, and information regarding the property (if any) that would be subject to the non-mortgage loan. The non-mortgage loan underwriting criteria 139 can be set by the financial institution for which the non-mortgage loan origination system 119 processes mortgage loan applications.

In one or more embodiments, the non-mortgage loan underwriting engine 136 can make underwriting decisions without further input from a user affiliated with the lender. In other embodiments, the mortgage loan underwriting engine 126 can make preliminary underwriting decisions, which must then be subsequently reviewed for final approval by a loan officer or other affiliate of the lender.

To facilitate communication with other devices and systems, the non-mortgage loan origination system 119 can provide an API. For example, client devices 106 and the mortgage loan origination system 116 can communicate with the non-mortgage loan origination system 119 using the API.

In one or more embodiments, the mortgage loan origination system 116 and the non-mortgage loan origination system 119 can be partitioned from each other. In this regard, the mortgage loan origination system 116 and the non-mortgage loan origination system 119 can be logically and/or physically separated and can have different access policies. For example, the mortgage loan origination system 116 can implement an access policy that is different from the access policy implemented by the non-mortgage loan origination system 119. For instance, the mortgage loan origination system 116 may permit only authenticated users who are affiliated with the mortgage loan operations of a lender to access the mortgage loan origination system 116, while the non-mortgage loan origination system 119 may permit only authenticated users who are affiliated with the non-mortgage loan operations of the lender to access the non-mortgage loan origination system 119. Partitioning the mortgage loan origination system 116 and the non-mortgage loan origination system 119 and having them implement separate access policies may improve data safety and security.

However, partitioning the mortgage loan origination system 116 and the non-mortgage loan origination system 119 and having them implement separate access policies may impede loan application processes. For example, if a particular employee has access to the mortgage loan origination system 116 but not the non-mortgage loan origination system 119, and if the employee needs information from the non-mortgage loan origination system 119 to process a mortgage loan application, then the processing of the application may be impeded because the employee may need to find and request another employee having access to the non-mortgage loan origination system 119 in order to process the application. As described below, various embodiments of the present disclosure overcome problems that may arise when the mortgage loan origination system 116 and the non-mortgage loan origination system 119 are partitioned and/or have different access policies.

The credit reporting system 123 can be a system that provides data relating to an applicant's credit history to the mortgage loan origination system 116, the non-mortgage loan origination system 119, and/or client devices 106. In one or more embodiments, the credit reporting system 123 can include a credit reporting engine 143 and a data store 129*c*. The credit reporting engine 143 can obtain and/or generate data representing a loan applicant's credit history. The credit reporting system 123 can store the data obtained and/or generated by the credit reporting engine 143 in the data store 129*c*.

The client device 106 is representative of multiple client devices 106 that can communicate through the network 113. According to various embodiments, the client device 106 can be operated by a loan applicant or someone affiliated with a lender, such as a loan officer. In one or more embodiments, the client device 106 can include a processor-based computer system, such as a desktop computer, a laptop computer, a mobile phone, or a tablet computer. The client device 106 can include output devices, such as a display 146, as well input devices, such as a mouse, keyboard, touch pad, or touch screen, which can facilitate a user interacting with and controlling the client device 106.

The client device 106 can execute a client application 149. The client application 149 can be used to interact with and communicate with the mortgage loan origination system 116, the non-mortgage loan origination system 119, and/or the credit reporting system 123. In some embodiments, the client application 149 can be embodied in the form of a web browser that can access network pages, such as webpages. In other embodiments, the client application 149 can be a stand-alone application dedicated to interacting with the mortgage loan origination system 116, the non-mortgage loan origination system, the credit reporting system 123, and/or other systems affiliated with a lender that operates the computing environment 103.

The client application 149 can be used to transmit loan application data 153 to the mortgage loan origination system 116, the non-mortgage loan origination system 119, and/or the credit reporting system 123. The loan application data 153 can include various data regarding the loan applicant and/or the property that is the subject of the loan application. For example, loan application data 153 for a personal home mortgage loan can include data representing the applicant's name, income, assets, debts, Social Security number, and address of the home. Loan application data 153 for a personal auto loan can include, for example, the applicant's name, income, assets, debts, Social Security number, and vehicle identification number (VIN) of the vehicle.

The credit bureau computing systems 109 can be computing platforms operated by credit bureaus. In one or more embodiments, the credit bureau computing systems 109 can include APIs to facilitate communication with other systems and devices. For example, the credit reporting system 123 can communicate with a credit bureau computing system 109 through an API to obtain credit report data 156, which can include data representing an applicant's financial and/or credit history. In some embodiments, credit report data 156 for a particular individual can represent personal information, such as the person's name, Social Security number, and date of birth; financial account information, such as the types of credit accounts opened by the applicant, credit limits for the accounts, loan balances for the accounts, and loan payment history; information about bankruptcies; and information about past-due accounts that have been turned over to collection agencies.

Next, examples of the operation of the networked environment 100 are described. In the following examples, it is assumed that the mortgage loan underwriting criteria 133 and the non-mortgage loan underwriting criteria 139 have been determined and stored in the respective data stores 129a-129b. Additionally, the following discussion assumes that an individual is using a client device 106 to apply for a mortgage loan and that the credit bureau computing systems 109 already have credit report data 156 for the individual.

To begin, the mortgage loan applicant can use the client application 149 in the client device 106 to input loan application data 153. For example, the applicant can input data representing his or her name, Social Security number, income, assets, debts, and information about the property for which he or she seeks the mortgage loan. The client device 106 can then transmit the loan application data 153 to the mortgage loan origination system 116.

In some embodiments, a client device 106 can be operated by an individual associated with the lender, such as a loan officer. In these embodiments, the loan officer or other individual associated with the lender can input all or some of the loan application data 153.

When the mortgage loan origination system 116 receives the loan application data 153, the mortgage loan origination system 116 can extract data it can use to obtain credit report data 156 for the applicant. For example, the mortgage loan origination system 116 can extract data representing the applicant's name, address, and Social Security number.

The mortgage loan origination system 116 can then provide the extracted data to the credit reporting system 123 and request the credit reporting system 123 to return credit report data 156 for the applicant. For example, using an API provided by the credit reporting system 123, the mortgage loan origination system 116 can transmit to the credit reporting system 123 an API call indicating that the mortgage loan origination system 116 is requesting the credit report data 156. The API call can include information identifying the applicant, such as the applicant's name, address, and Social Security number.

Upon the credit reporting system 123 receiving the request to provide the credit report data 156, the credit reporting engine 143 can search the data store 129c to determine whether it contains current credit report data 156 for the applicant. If the data store 129c does not contain current credit report data 156 for the applicant, the credit reporting engine 143 can request credit report data 156 from one or more of the credit bureau computing systems 109. In various embodiments, the credit reporting engine 143 can use an API provided by the credit bureau computing systems 109 to request the credit report data 156. For example, the credit reporting engine 143 can transmit one or more API calls that include information identifying the applicant, and the credit bureau computing systems 109 can recognize the API calls as being requests for the credit report data 156 for the applicant.

Upon receiving a request from the credit reporting engine 143, a credit bureau computing system 109 can transmit the credit report data 156 to the credit reporting system 123. In some embodiments, the credit report data 156 transmitted to the credit reporting engine 143 can represent a single-bureau credit report. In other embodiments, the credit report data 156 can represent a merger of multiple credit reports from multiple credit bureaus. Such a merged credit report can be a tri-merged credit report, which is also referred to as a "residential mortgage credit report."

When the credit reporting engine obtains the credit report data 156 from a credit bureau computing system 109, the credit reporting engine 143 can store a copy in the data store 129c. Additionally, the credit reporting engine 143 can format the credit report data 156 so that it is in a form that the mortgage loan origination system 116 and/or non-mortgage loan origination system 119 can recognize and process. Furthermore, if the credit reporting engine 143 obtained credit report data 156 from multiple credit bureau computing systems 109, the credit reporting engine 143 can merge the data into a single instance of credit report data 156.

The credit reporting system 123 can then transmit the credit report data 156 to the mortgage loan origination system 116. Upon receiving the credit report data 156, the mortgage loan origination system 116 can input the credit report data 156 into the mortgage loan underwriting engine 126.

The mortgage loan underwriting engine 126 can then compare the credit report data 156 to the mortgage loan underwriting criteria 133 to determine the mortgage loan products for which the applicant is and is not qualified. For example, the mortgage loan underwriting engine 126 may determine, based on the applicant's credit score, debt-to-income ratio, and other information represented in the credit report data 156, that the applicant is qualified for (1) a first mortgage loan product in which the term is 30 years at 4.00% annual percentage rate (APR) with $1,200 in fees; (2) a second mortgage loan product in which the term is 30 years at 3.50% APR with $5,200 in fees; and (3) a third mortgage loan product in which the term is 30 years at 3.25% APR with $6,200 in fees.

Once the mortgage loan underwriting engine 126 has determined the mortgage loan products for which the applicant is and is not qualified, the mortgage loan origination system 116 can initiate the process of determining whether the applicant could become qualified for additional mortgage loan products that may have more desirable terms than those for which the applicant is already qualified. For example, the mortgage loan origination system 116 can initiate the process of determining whether one or more modifications to the applicant's existing non-mortgage debt, such as consolidating or refinancing non-mortgage loans or debt, could cause the applicant to become qualified for additional mortgage loan products with more desirable terms than those for which the applicant has already been approved.

To initiate the process, the mortgage loan origination system 116 can transmit a request for the non-mortgage loan origination system 119 to return data representing any non-mortgage loan products for which the applicant would qualify that correspond to the applicant's existing debts. For example, if the applicant has an existing auto loan and multiple credit cards with balances, the mortgage loan origination system 116 can request the non-mortgage loan origination system 119 to return data representing non-mortgage loan products including auto loan refinance products and debt consolidation loan products. In some embodiments, the request transmitted from the mortgage loan origination system 116 to the non-mortgage loan origination system 119 can be in the form of an API call.

When the non-mortgage loan origination system 119 receives the request from the mortgage loan origination system 116, the non-mortgage loan origination system 119 can obtain credit report data 156 for the applicant. In some embodiments, the non-mortgage loan origination system 119 can request the credit report data 156 from the credit reporting system 123 using an API call, and the credit reporting system 123 can provide the credit report data 156 after obtaining it from the credit bureau computing system 109.

Furthermore, in some embodiments, the mortgage loan origination system 116 provides the non-mortgage loan origination system 119 with a unique identifier of the versions of the credit report data 156 that the mortgage loan origination system 116 had used. The non-mortgage loan origination system 119 can pass the unique identifier to the credit reporting system 123, so that the credit reporting engine 143 can obtain the corresponding credit report data 156 that was previously stored in the data store 129c of the credit reporting system 123. Furthermore, in alternative embodiments, the mortgage loan origination system 116 can provide the credit report data 156 directly to the non-mortgage loan origination system 119, so that the non-mortgage loan origination system 119 does not have to subsequently obtain the credit report data 156.

In some embodiments, the non-mortgage loan origination system 119 may need additional data regarding the applicant and/or the applicant's existing debts or loans. If the non-mortgage loan origination system 119 needs additional data, it may request and obtain the data from the mortgage loan origination system 116 and/or from the applicant or a loan officer using a client device 106.

Once the non-mortgage loan origination system 119 has obtained credit report data 156 for the applicant, the non-mortgage loan underwriting engine 136 can then compare the credit report data 156 to the non-mortgage loan underwriting criteria 139 to determine the non-mortgage loan products for which the applicant would be qualified. As an example, the non-mortgage loan underwriting engine 136 may identify that the applicant has an existing auto loan and, based on the applicant's credit score, debt-to-income ratio, and other information represented in the credit report data 156, determine that the applicant would qualify for an auto refinance loan with a particular APR, duration, and fees. As another example, the non-mortgage loan underwriting engine 136 may identify that the applicant has balances on three credit cards and determine that the applicant would qualify for a debt consolidation loan for the total amount owed for a particular APR, duration, and amount of fees.

Once the non-mortgage loan underwriting engine 136 has determined the non-mortgage loan products for which the applicant would qualify, the non-mortgage loan origination system 119 can transmit a list of the non-mortgage products to the mortgage loan origination system 116.

Upon receiving the list of non-mortgage products, the mortgage loan origination system 116 can generate one or more modified versions of the applicant's credit report data 156 that incorporates the non-mortgage loan products. More specifically, the mortgage loan origination system 116 can generate modified versions of the applicant's credit report data 156, in which each modified version has one or more of the applicant's existing loans or debts replaced by one or more of the non-mortgage loan products identified in the list obtained from the non-mortgage loan origination system 119. As an example, if the applicant has an existing auto loan and balances on three credit cards, and if the non-mortgage loan origination system 119 provided a list indicating that the applicant would qualify for (1) an auto refinance loan and (2) a debt consolidation loan for the credit cards, the mortgage loan origination system 116 can generate (1) a first modified version of the credit report data 156 in which the auto loan is replaced with the auto refinance loan, (2) a second modified version of the credit report data 156 in which the three credit cards are replaced with the debt consolidation loan, and (3) a third modified version of the credit report data 156 in which the auto loan is replaced with the auto refinance loan and the three credit cards are replaced with the debt consolidation loan.

Additionally, the mortgage loan origination system 116 can input each modified version of the credit report data 156 into the mortgage loan underwriting engine 126, and the mortgage loan underwriting engine 126 can compare the modified credit report data 156 to the mortgage loan underwriting criteria 133 to determine the mortgage loan products for which the applicant would and would not qualify. In this way, the mortgage loan origination system 116 can simulate the results of the applicant obtaining one or more of the non-mortgage loan products identified by the non-mortgage loan origination system 119 and determine whether obtaining one or more of the non-mortgage loan products would cause the applicant to become qualified for any additional mortgage loan products. For example, it may be the case that the applicant would qualify for a mortgage loan product with a lower interest rate if the applicant refinanced an existing auto loan with a product identified by the non-mortgage loan origination system 119. In this example, the applicant may be approved for the more desirable mortgage loan product because refinancing the auto loan has improved the applicant's debt-to-income ratio, which may be a factor defined in the mortgage loan underwriting criteria 133.

The mortgage loan origination system 116 can compare the original results generated by the mortgage loan underwriting engine 126, which used the applicant's actual credit report data 156, with the results generated by the mortgage loan underwriting engine 126 that used the modified versions of the credit report data 156. In particular, the mortgage loan origination system 116 can compare the results to determine whether the modified versions of the credit report data 156 caused the applicant to become qualified for one or more mortgage loan products for which the applicant was not qualified when using the applicant's actual credit report data 156. If the applicant qualified for additional mortgage loan products, then the mortgage loan origination system 116 can conclude that the applicant would be qualified for the additional mortgage loan products if the applicant obtains the corresponding non-mortgage loan products as indicated in the modified versions of the credit report data 156.

Additionally, the mortgage loan origination system 116 can encode and transmit to a client device 106 a user interface that represents various information obtained and/or generated by the mortgage loan origination system 116. For example, the mortgage loan origination system 116 can generate a user interface that indicates that the applicant currently qualifies for a particular mortgage loan product and that the applicant would qualify for additional mortgage loan products with more desirable terms if the applicant obtained particular non-mortgage loan products. The user interface can also include information describing the non-mortgage loan products. Also, the user interface can indicate how the applicant's credit score(s) would be expected to change if the applicant obtains one or more of the non-mortgage loan products.

Additionally, the user interface generated by the mortgage loan origination system 116 can facilitate the applicant obtaining one or more of the non-mortgage loan products that would result in qualification for the more desirable mortgage loan products. For example, the user interface can include a button that, if selected by the user of the client device 106, initiates the application process for an identified non-mortgage product.

If an applicant initiates the application process for an identified non-mortgage product, the mortgage loan origination system 116 can transmit loan application data 153 to the non-mortgage loan origination system 119, so that the non-mortgage loan origination system 119 can begin its underwriting process. In some embodiments, the mortgage loan origination system 116 can transmit data representing the applicant's name, Social Security number, address, assets, and debts to the non-mortgage loan origination system 119 in conjunction with a request to begin the non-mortgage loan underwriting process. If the non-mortgage loan origination system 119 needs additional information for the application, the non-mortgage loan origination system 119 can transmit a request to the mortgage loan origination system 116 to obtain and return the information. Alternatively, the non-mortgage loan origination system 119 can transmit a request to the client device 106, without using the mortgage loan origination system 116 as an intermediary.

When the non-mortgage loan origination system 119 receives the loan application data 153, it can proceed with the underwriting process. Because the non-mortgage loan origination system 119 had previously determined that the applicant would be approved for the non-mortgage loan product, the non-mortgage loan origination system 119 can continue from that point in the application process. In other embodiments, the non-mortgage loan origination system 119 can proceed by inputting the applicant's credit report data 156 into the non-mortgage underwriting engine 136 to determine whether the applicant is approved for the requested non-mortgage loan product, using the techniques described above.

The non-mortgage loan origination system 119 can proceed with the underwriting process and periodically notify the mortgage loan origination system 116 of the application status. Because the user of the client device 106 may not have access to the non-mortgage loan origination system 119, informing the mortgage loan origination system 116 of the application status can overcome at least some of the problems that can arise when a financial institution partitions the mortgage loan origination system 116 from the non-mortgage loan origination system 119 and/or implements separate access policies for the mortgage loan origination system 116 and non-mortgage loan origination system 119. That is, a user who has access to the mortgage loan origination system 116 can obtain information regarding the status of the non-mortgage loan application by the mortgage loan origination system 116 operating as an intermediary between the user and the non-mortgage loan origination system 119. This arrangement facilitates the loan application process while the mortgage loan origination system 116 and the non-mortgage loan origination system 119 are partitioned and their respective access policies remain in place.

When the mortgage loan origination system 116 receives a notification from the non-mortgage loan origination system 119 that the requested non-mortgage loan has been approved and created, the mortgage loan origination system 116 can obtain an updated version of the credit report data 156 using one or more of the techniques described above. The updated version of the credit report data 156 can include information regarding the non-mortgage loan product that was created at the request of the mortgage loan origination system 116. Additionally, if the newly-created non-mortgage loan product replaced one or more previously existing debts, the updated version of the credit report data 156 can reflect the change.

The mortgage loan origination system 116 can then input the updated credit report data 156 into the mortgage loan underwriting engine 126 and determine the mortgage loan products for which the applicant is and is not qualified, using the techniques described above. In alternative embodiments, since the mortgage loan underwriting engine 126 had already determined that the applicant would qualify for one or more particular mortgage loan products if the applicant obtained the newly-created non-mortgage loan, the mortgage loan origination system 116 can determine that the applicant is qualified for the one or more mortgage loan products that the mortgage loan underwriting engine 126 had previously identified, without inputting the updated credit report data 156 into the mortgage loan underwriting engine 126.

Once the mortgage loan origination system 116 determines that the applicant qualifies for one or more mortgage loan products after the applicant obtained the non-mortgage product, the mortgage loan origination system 116 can encode a user interface that represents the information and transmit the user interface to a client device 106. The user interface can also include, for example, a button that a user can select to initiate the underwriting process for a particular mortgage loan product. In alternative embodiments, the applicant can request to proceed with the underwriting process for a particular mortgage loan when the mortgage loan origination system 116 first notifies the applicant that obtaining a non-mortgage loan product would cause the applicant to become qualified for one or more additional mortgage loan products.

Figure 2:
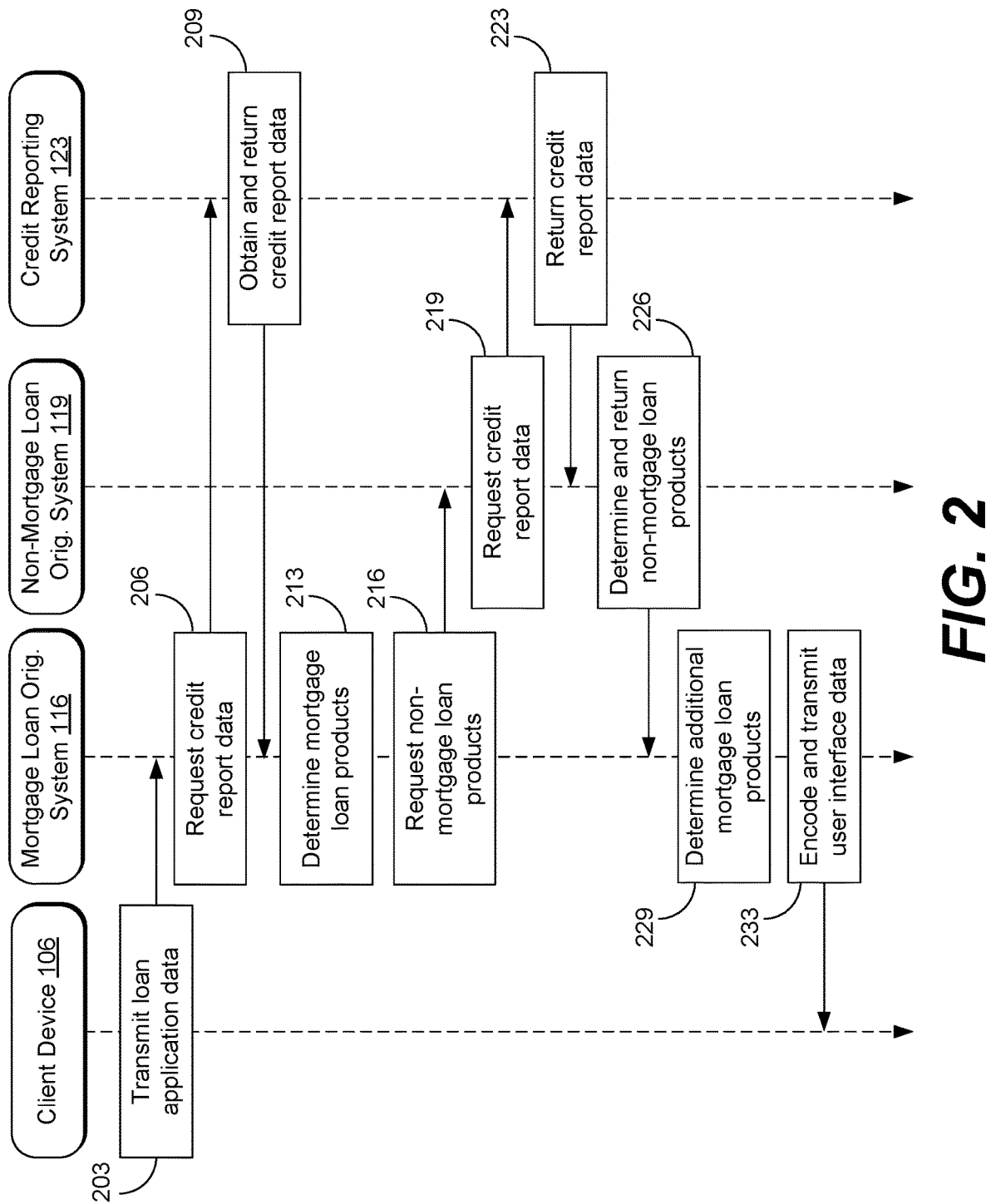
FIG. 2 is a sequence diagram illustrating an example of functionality implemented by components of the networked environment of FIG. 1 according to various embodiments of the present disclosure.

Referring next to FIG. 2, shown is sequence diagram illustrating an example of functionality implemented by components of the networked environment 100 according to various embodiments of the present disclosure. In particular, the sequence diagram of FIG. 2 illustrates an example of the mortgage loan origination system 116 operating in conjunction with the client device 106, the non-mortgage loan origination system 119, and the credit reporting system 123 to determine mortgage loan products for which an applicant qualifies and additional mortgage loan products for which the applicant would qualify if the applicant obtains one or more non-mortgage loan products.

Beginning at box 203, the client device 106 can transmit loan application data 153 to the mortgage loan origination system 116. In some embodiments, the client device 106 can transmit the loan application data 153 in conjunction with a request for the mortgage loan origination system 116 to determine the mortgage loan products for which the applicant qualifies. Additionally, the client device 106 can include the loan application data 153 as parameters of an API call to the mortgage loan origination system 116.

At box 206, the mortgage loan origination system 116 can transmit a request for credit report data 156 to the credit reporting system 123. The request can an API call that the credit reporting system 123 recognizes as a request to return credit report data 156. Additionally, the API call can include identifying information for the applicant, such as data representing the applicant's name, address, and Social Security number, that the credit reporting system 123 can use to obtain credit report data 156 for the applicant At box 209, the credit reporting system 123 can obtain and transmit the requested credit report data 156 to the mortgage loan origination system 116. In some embodiments, the credit report data 156 can be based on information representing one or more credit reports that the credit reporting system 123 obtained from one or more credit bureau computing systems 109.

As indicated at box 213, once the mortgage loan origination system 116 receives the credit report data 156, the mortgage loan origination system 116 can determine the mortgage loan products for which the applicant is and is not qualified based on the applicant's current credit report data 156. To this end, the mortgage loan origination system 116 can, for example, input the applicant's credit report data 156 into the mortgage loan underwriting engine 126, as discussed above.

After the mortgage loan origination system has determined the mortgage loan products for which the applicant is and is not qualified, the mortgage loan origination system 116 can move to box 216 and transmit a request for the non-mortgage loan origination system 119 to provide a list of non-mortgage loan products for which the applicant would qualify. In some embodiments, the request can be an API call that the mortgage loan origination system 116 transmits to the non-mortgage loan origination system. Additionally, the API call can include as a parameter a unique identifier for the credit report data 156 that the mortgage loan underwriting engine 126 used when determining the mortgage loan products for which the applicant qualified.

As indicated at box 219, when the non-mortgage loan origination system 119 receives the request to provide a list of non-mortgage loan products for which the applicant would qualify, the non-mortgage loan origination system 119 can request the credit reporting system 123 to provide credit report data 156 for the applicant. In some embodiments, the request can be an API call to the credit reporting system 123. Furthermore, the API call can include the unique identifier for the credit report data 156 that the mortgage loan origination system 116 provided.

At box 223, the credit reporting system 123 can transmit the applicant's credit report data 156 to the non-mortgage loan origination system 119. In some embodiments, the credit reporting system 123 can use the unique identifier of the applicant's credit report data 156 to locate the credit report data 156 in the data store 129c of the credit reporting system 123. In other embodiments, the credit reporting system 123 can obtain the credit report data 156 from the credit bureau computing system 109 and then transmit the credit report data 156 to the non-mortgage loan origination system 119.

As shown at box 226, the non-mortgage loan origination system 119 can then determine the non-mortgage loan products for which the applicant would qualify and transmit a list identifying the non-mortgage loan products to the mortgage loan origination system 116. To determine the non-mortgage loan products for which the applicant would qualify, the non-mortgage loan origination system 119 can input the credit report data 156 received from the credit reporting system 123 into the non-mortgage loan underwriting engine 136, as discussed above.

At box 229, after the mortgage loan origination system 116 receives a list of the non-mortgage loans for which the applicant would qualify, the mortgage loan origination system 116 can determine whether the applicant would qualify for any additional mortgage loan products if the applicant were to obtain one or more of the identified non-mortgage loan products. To this end, the mortgage loan origination system 116 can generate a modified version of the credit report data 156 in which one or more existing debts are replaced with one or more of the identified non-mortgage loan products, as described above.

Then, at box 233, the mortgage loan origination system 116 can encode and transmit user interface data to the client device 106 for rendering by the client application 149. The user interface data can include, for example, data representing the mortgage loan products for which the applicant qualifies. The user interface data can also include data representing any non-mortgage loan products for which the applicant would qualify and the mortgage loan products for which the applicant would qualify if the applicant obtained the non-mortgage loan products. Additionally, the user interface data can include data representing one or more buttons that, if selected by a user of the client application 149, can initiate a loan application process for a particular loan product.

Figure 3A:
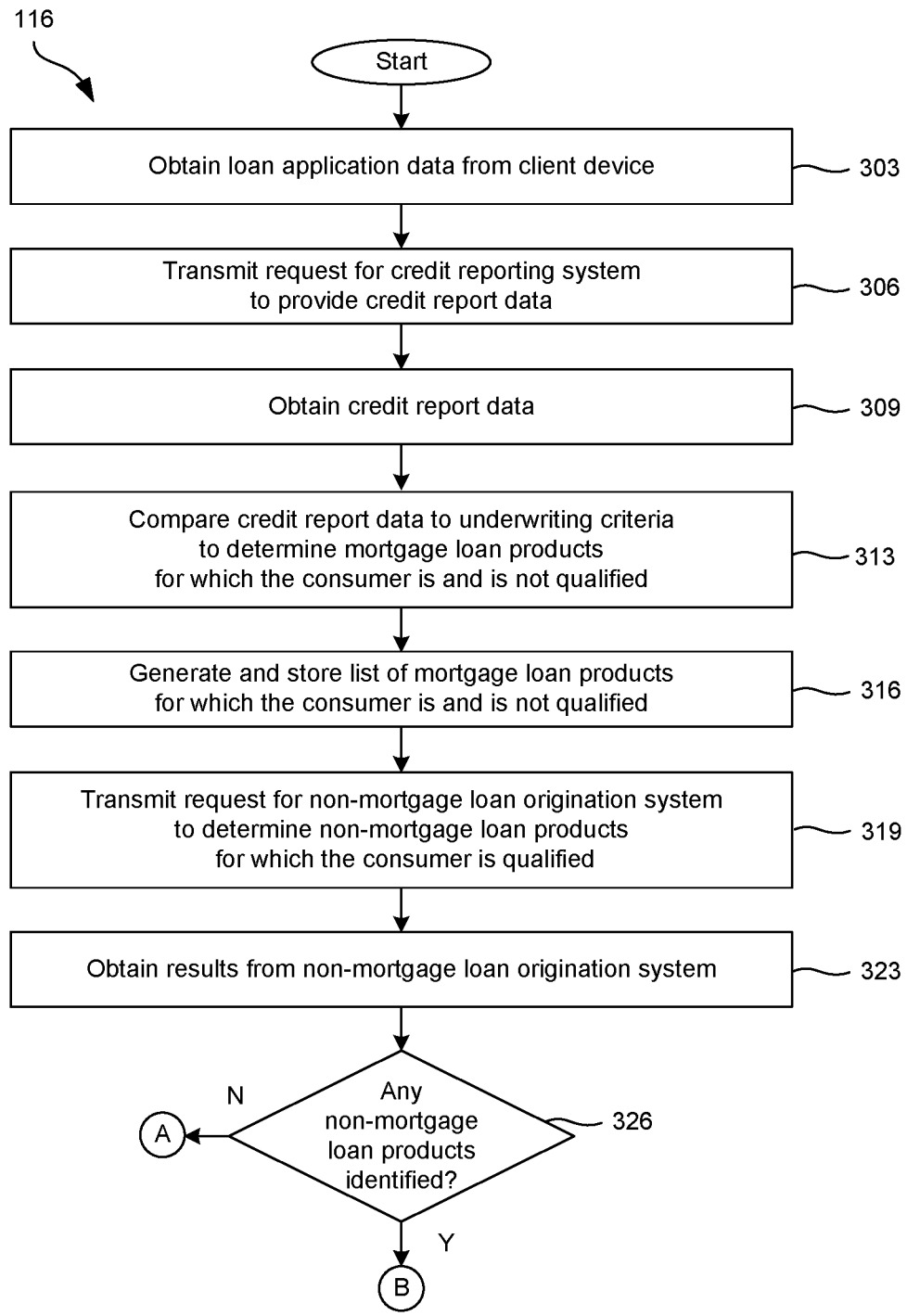
FIGS. 3A-3B are a flowchart illustrating an example of functionality implemented by a mortgage loan origination system of the networked environment of FIG. 1 according to various embodiments of the present disclosure.
Figure 3B:
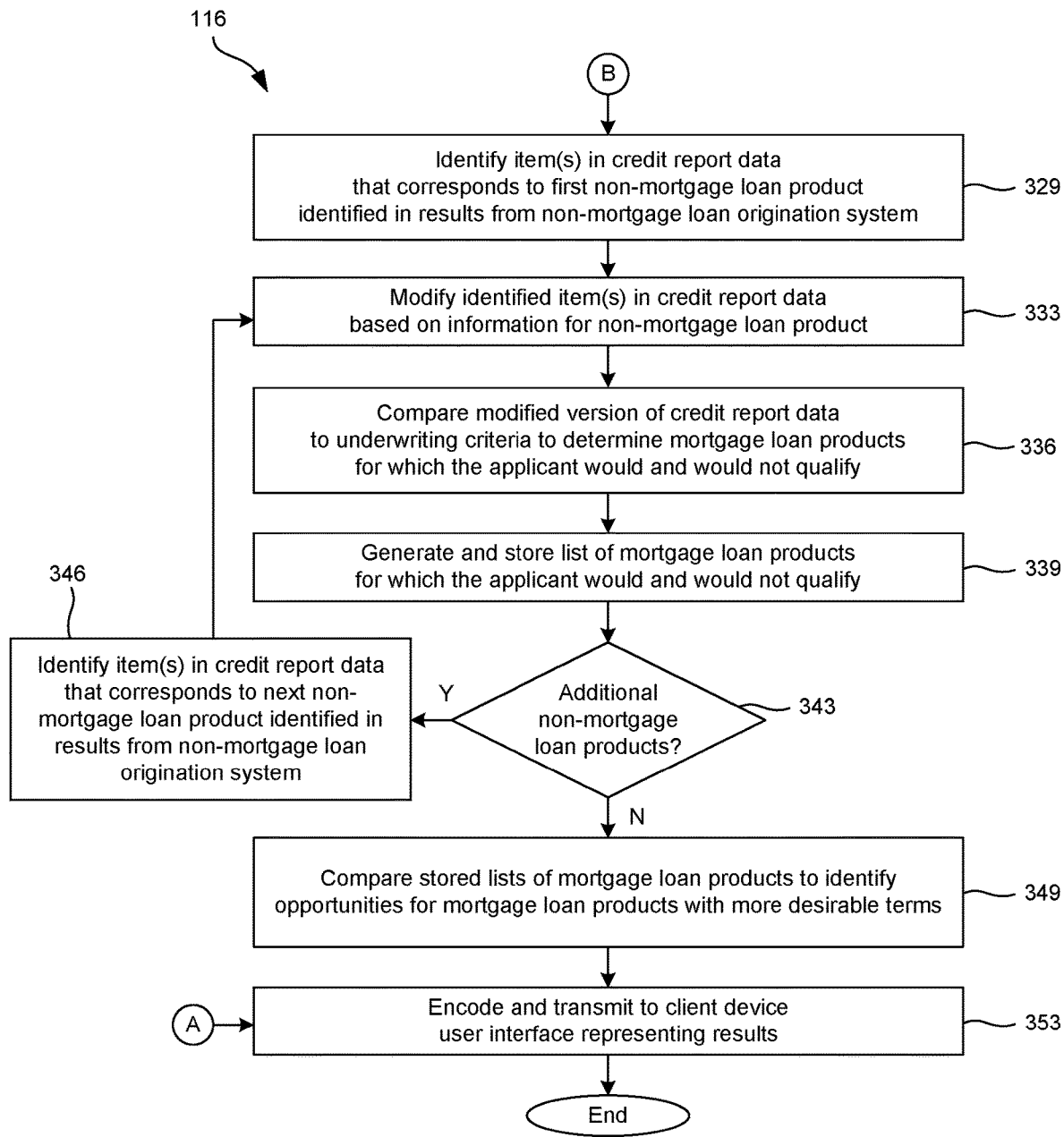

With reference to FIGS. 3A-3B, shown is a flowchart illustrating an example of functionality implemented by the mortgage loan origination system 116 according to various embodiments of the present disclosure. In particular, the flow chart of FIGS. 3A-3B illustrates an example of the mortgage loan origination system 116 determining one or more mortgage loan products for which an applicant qualifies, determining one or more additionally mortgage loan products for which the applicant would qualify if the applicant obtained one or more non-mortgage loan products, and providing this information to a user of the client application 149.

Beginning with box 303 in FIG. 3A, the mortgage loan origination system 116 can obtain loan application data 153 from the client device 106. The loan application data 153 can include, for example, the applicant's name, address, Social Security number, and information describing the property for which the applicant seeks a mortgage loan product.

At box 306, the mortgage loan origination system 116 can transmit a request for the credit reporting system 123 to provide credit report data 156 for the application. In some embodiments, the request can be an API call that includes data representing loan application data 153 that the mortgage loan origination system 116 obtained.

At box 309, the mortgage loan origination system 116 obtains the requested credit report data 156 for the applicant from the credit reporting system 123. The credit report data 156 can represent, for example, a single-bureau credit report or a tri-merged credit report.

Once the mortgage loan origination system 116 has obtained the credit report data 156, the mortgage loan origination system 116 can proceed to box 313 and compare the credit report data 156 to the mortgage loan underwriting criteria 133 to determine the mortgage loan products for which the applicant is and is not qualified. For example, the mortgage loan origination system 116 may determine, based on the applicant's credit report data 156 and the mortgage loan underwriting criteria 133, that the applicant qualifies for one or more particular mortgage loan products and does not qualify for other mortgage loan products. At box 316, the mortgage loan origination system 116 can generate and store a list of the mortgage loan products for which the applicant is and is not qualified.

The mortgage loan origination system 116 can then transmit a request for the non-mortgage loan origination system 119 to determine any non-mortgage loan products for which the consumer would qualify, as indicated at box 319. In some examples, the request can be an API call transmitted by the non-mortgage loan origination system 119. Additionally, in some embodiments, the API call can include a unique identifier that identifies the credit report data 156 that the mortgage loan origination system 116 had used to determine the mortgage loan products for which the applicant qualifies.

Then, at box 323, the mortgage loan origination system 116 obtains the results from the non-mortgage loan origination system 119. In particular, the mortgage loan origination system 116 can receive data representing any non-mortgage loan products for which the applicant is qualified.

At box 326, the mortgage loan origination system 116 determines whether there are any non-mortgage products identified in the results from the non-mortgage loan origination system 119. If no non-mortgage products are identified in the results, this indicates that the applicant would not qualify for any non-mortgage loan products, and the mortgage loan origination system 116 can proceed to box 353 in FIG. 3B. Otherwise, if there are one or more non-mortgage products identified in the results, the mortgage loan origination system 116 can proceed to box 329 in FIG. 3B.

At box 329 in FIG. 3B, the mortgage loan origination system 116 can then identify one or more items in the applicant's credit report data 156 that correspond to the first non-mortgage loan product in the results received from the non-mortgage loan origination system 119. For example, the mortgage loan origination system 116 can determine that an existing auto loan in the applicant's credit report data 156 corresponds with an auto refinance loan identified in the results from the non-mortgage loan origination system 119. As another example, the mortgage loan origination system 116 can determine that three credit cards referenced in the applicant's credit report data 156 correspond to a debt consolidation loan in the results received from the non-mortgage loan origination system 119.

At box 333, the mortgage loan origination system 116 can modify the identified items in the credit report data 156 based on the information for the corresponding non-mortgage loan opportunity. For example, if the mortgage loan origination system 116 identified an auto loan in the credit report data 156, the mortgage loan origination system 116 can replace the data representing the auto loan with data representing the corresponding auto refinance loan identified in the results from the non-mortgage loan origination system 119. As another example, if the mortgage loan origination system 116 identified three credit cards in the credit report data 156, the mortgage loan origination system 116 can replace the data representing the credit cards with data representing the corresponding debt consolation loan identified in the results from the non-mortgage loan origination system 119. In this way, the mortgage loan origination system 116 can generate a modified version of the credit report data 156, which represents how the credit report data 156 would appear if the applicant obtained the non-mortgage loan product.

At box 336, the mortgage loan origination system 116 can then compare the modified version of the credit report data 156 to the mortgage loan underwriting criteria 133 to determine the mortgage loan products for which the applicant would and would not qualify. The mortgage loan origination system 116 can then generate and store a list of the results in box 339.

The mortgage loan origination system 116 can then move to box 343 and determine whether the results obtained from the non-mortgage loan origination system 119 at box 323 (FIG. 3A) include any additional non-mortgage loan products for which the applicant would qualify. If there are one or more additional non-mortgage loan products for which the applicant would qualify, then the mortgage loan origination system 116 can move to box 346, identify any items in the applicant's credit report data 156 that correspond to the next item in the results from the non-mortgage loan origination system 119, and repeat the functionality indicated at boxes 333-343. In this way, the mortgage loan origination system 116 can determine whether obtaining each the non-mortgage loan product identified in the results from the non-mortgage loan origination system 119 would cause the applicant to qualify for one or more mortgage loan products having more desirable terms than the mortgage loan products for which the applicant already qualifies.

Once the mortgage loan origination system 116 determines that there are no additional non-mortgage loan products identified in the results from the non-mortgage loan origination system 119 at box 343, the mortgage loan origination system 116 can proceed to box 349 and compare each list created at box 339 with the list created at box 316. In particular, the mortgage loan origination system 116 can compare the list of mortgage loan opportunities for which the applicant already qualifies with each list of mortgage loan products for which the applicant would qualify if the applicant were to obtain one or more non-mortgage products. The mortgage loan origination system 116 can compare the lists to determine whether the applicant would qualify for one or more mortgage loan products having more desirable terms than the mortgage loan products for which the applicant is already qualified.

At box 353, the mortgage loan origination system 116 can encode and transmit to the client device 106 one or more user interfaces that represent the results of the functionality depicted in FIGS. 3A-3B. For example, a user interface could present a side-by-side comparison of the mortgage loan products for which the applicant is already qualified with mortgage loan products for which the applicant would qualify if the applicant obtained a particular non-mortgage loan product. After box 353, the process can end.

Figure 4:
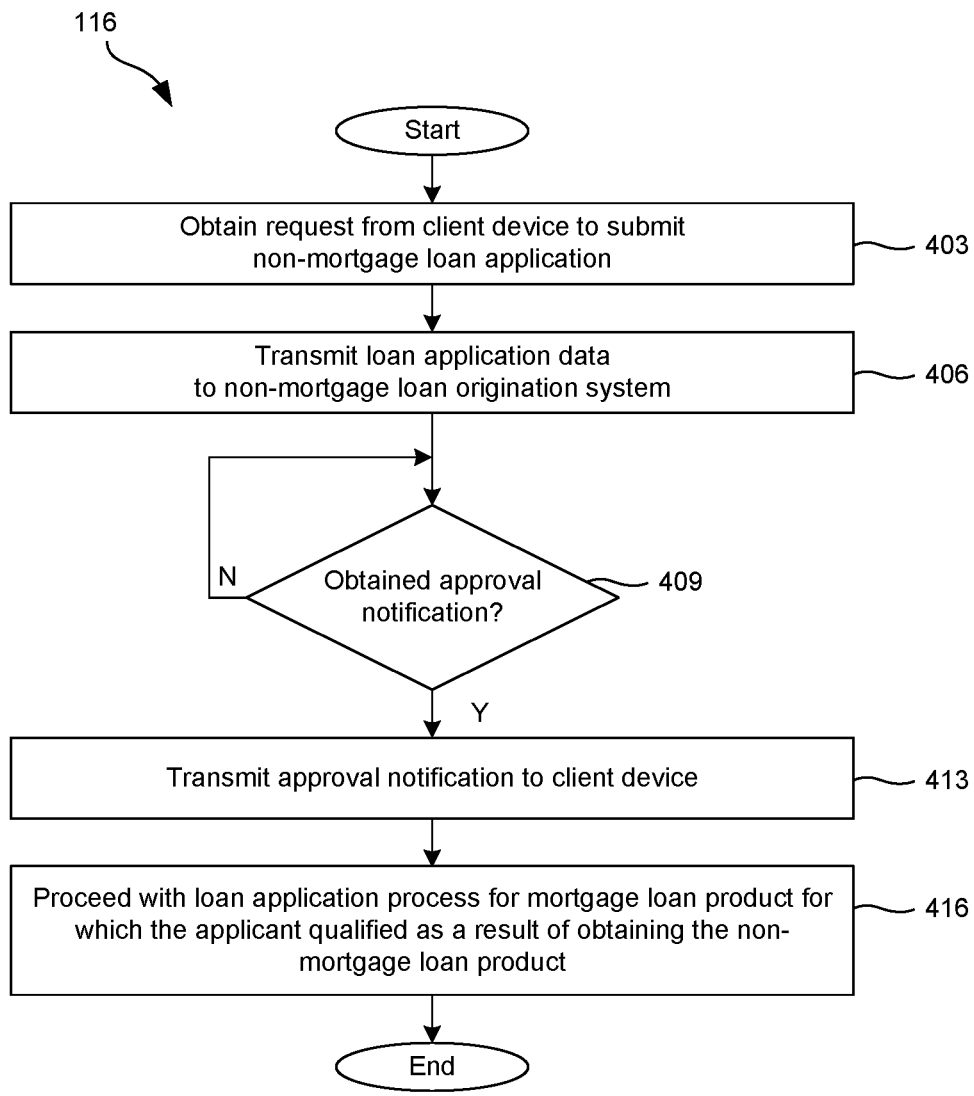
FIG. 4 is a flowchart illustrating another example of functionality implemented by the mortgage loan origination system of the networked environment of FIG. 1 according to various embodiments of the present disclosure.

With reference to FIG. 4, shown is a flowchart illustrating another example of functionality implemented by the mortgage loan origination system 116 according to various embodiments of the present disclosure. In particular, the flowchart of FIG. 4 depicts an example of the mortgage loan origination system 116 communicating with the non-mortgage loan origination system 119 to facilitate creation of a non-mortgage loan product and proceeding with an application for a mortgage loan product for which the applicant qualified as a result of the non-mortgage loan product. The functionality depicted in the flowchart of FIG. 4 can be performed, for example, after the functionality depicted in the flowchart of FIGS. 3A-3B has been performed.

Beginning at box 403, the mortgage loan origination system 116 can obtain a request from the client device 106 to submit an application for a particular non-mortgage loan. At box 406, the mortgage loan origination system 116 can transmit loan application data 153 for the applicant to the non-mortgage loan origination system 119. In some embodiments, the loan application data 153 can include data that the mortgage loan origination system 116 previously obtained when the applicant initiated the application process for a mortgage loan. Additionally, in some embodiments, the mortgage loan origination system 116 can obtain additional loan application data 153 for the non-mortgage loan application from the client device 106.

At box 409, the mortgage loan origination system 116 can wait until it has obtained data indicating that the non-mortgage loan application has been approved. As described above, the non-mortgage loan origination system 119 can periodically transmit status updates regarding the non-mortgage loan application to the mortgage loan origination system 116.

Once the mortgage loan origination system 116 has obtained data indicating that the non-mortgage loan application was approved, the mortgage loan origination system 116 can transmit a notification to the client device 106 to inform the applicant and/or loan officer that the non-mortgage loan was approved, as shown at box 413. Additionally, at box 416, the mortgage loan origination system 116 can proceed with the mortgage loan application process for the mortgage loan product for which the applicant qualified as a result of obtaining the non-mortgage loan product. In some embodiments, the mortgage loan origination system 116 can proceed with the mortgage loan application without further input from a user. After box 416, the process can end.

Figure 5:
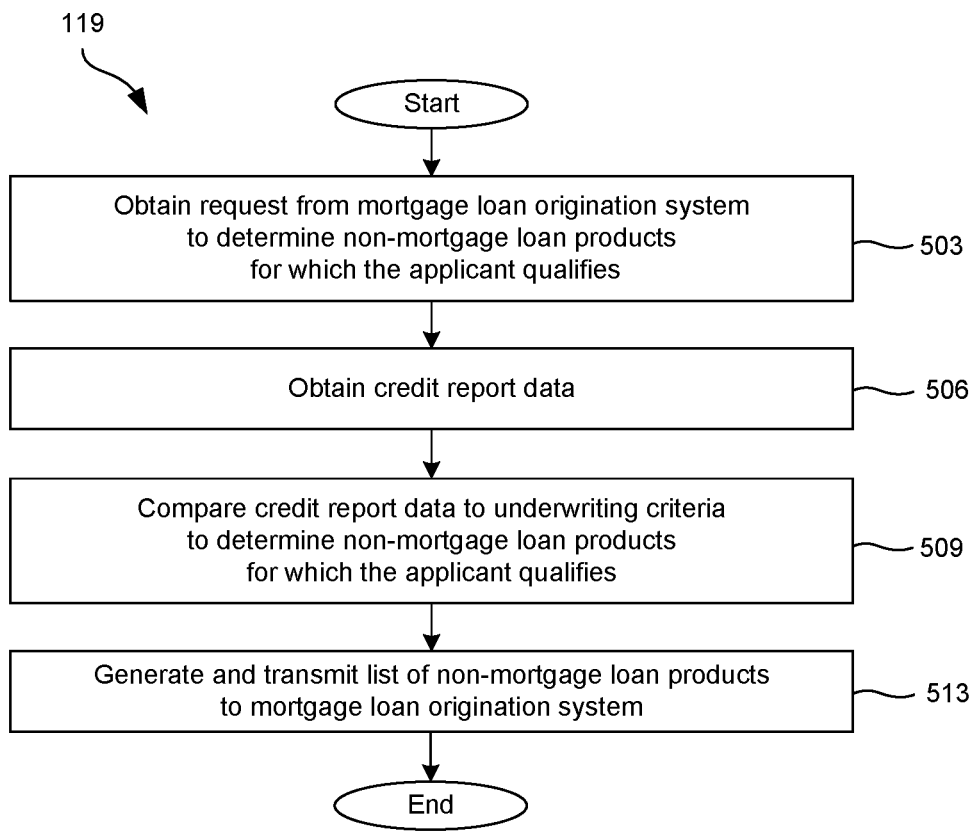
FIG. 5 is a flowchart illustrating an example of functionality implemented by a non-mortgage loan origination system of the networked environment of FIG. 1 according to various embodiments of the present disclosure.

With reference to FIG. 5, shown is a flowchart illustrating an example of functionality implemented by the non-mortgage loan origination system 119 according to various embodiments of the present disclosure. In particular, the flowchart of FIG. 5 depicts an example of the non-mortgage loan origination system 119 determining the non-mortgage loan products for which an applicant qualifies. The non-mortgage loan origination system 119 can perform the functionality depicted in the flowchart of FIG. 5, for example, in response to the mortgage loan origination system 116 transmitting a request as indicated at box 319 in FIG. 3A.

Beginning at box 503, the non-mortgage loan origination system 119 can obtain a request from the mortgage loan origination system 116 to determine one or more non-mortgage loan products for which the applicant qualifies. The request in some embodiments can be an API call that the non-mortgage loan origination system 119 can recognize as a request to return data representing non-mortgage loan products for which the applicant is qualified.

At box 506, the non-mortgage loan origination system 119 can obtain the credit report data 156 for the applicant. In one or more embodiments, the non-mortgage loan origination system 119 can obtain the credit report data 156 from the mortgage loan origination system 116. In other embodiments, the mortgage loan origination system 116 can provide a unique identifier for the applicant's credit report data 156 that the non-mortgage loan origination system 119 can use to locate the credit report data 156 from the credit reporting system 123. In other embodiments, the non-mortgage loan origination system 119 can obtain the credit report data 156 from one or more credit bureau computing systems 109.

After the non-mortgage loan origination system has obtained the credit report data 156 for the applicant, the non-mortgage loan underwriting engine 136 of the non-mortgage loan origination system 119 can compare the credit report data 156 to the non-mortgage loan underwriting criteria 139 to determine the non-mortgage loan products for which the applicant qualifies, as indicated at box 509.

Then, at box 513, the non-mortgage loan origination system 119 can generate and transmit to the mortgage loan origination system 116 a list of the non-mortgage loan products for which the applicant is qualified. Thereafter, the process can end.

Figure 6:
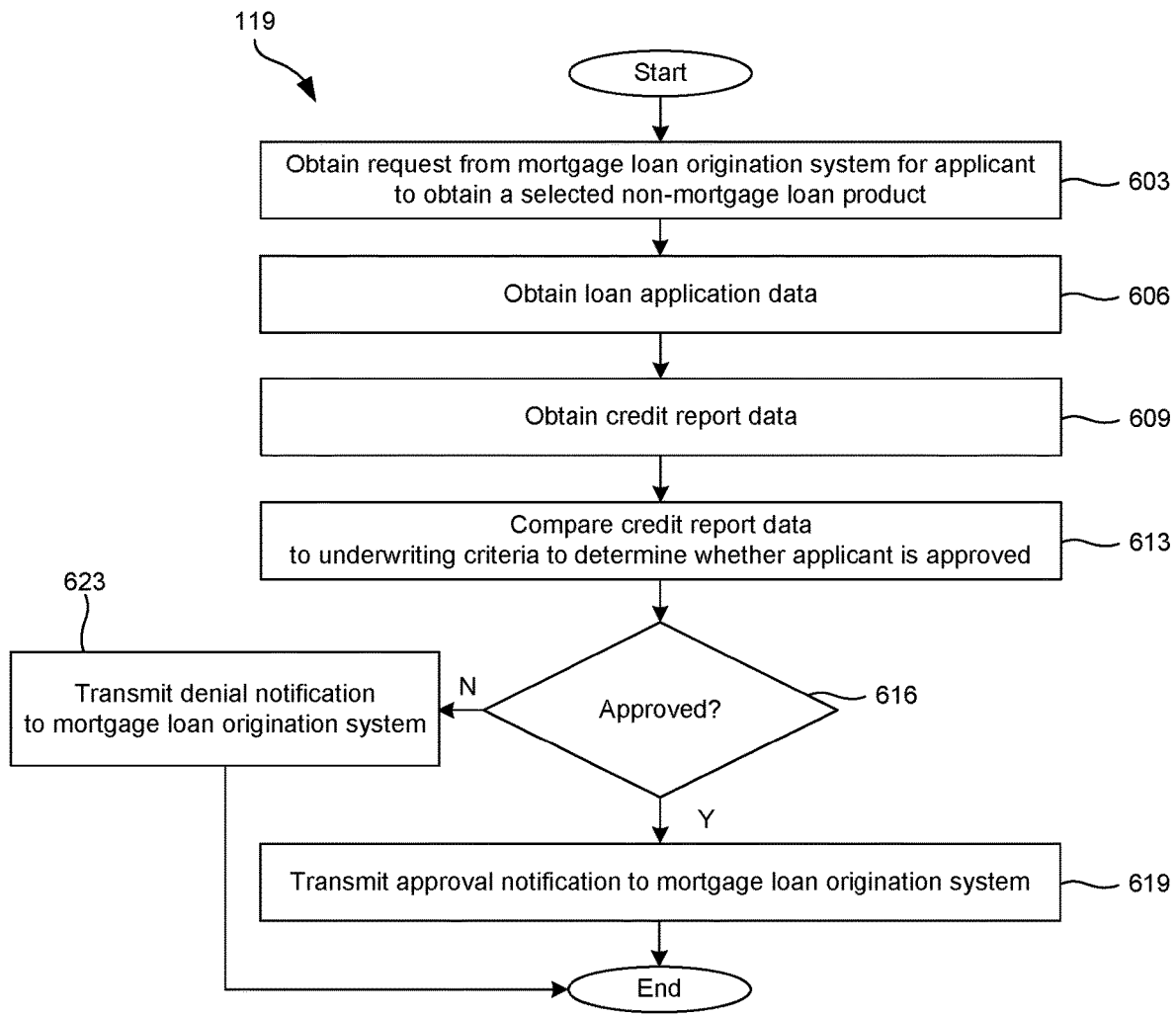
FIG. 6 is a flowchart illustrating another example of functionality implemented by a non-mortgage loan origination system of the networked environment of FIG. 1 according to various embodiments of the present disclosure.

With reference to FIG. 6, shown is a flowchart illustrating an example of functionality implemented by the non-mortgage loan origination system 119 according to various embodiments of the present disclosure. In particular, the flowchart of FIG. 6 depicts an example of the non-mortgage loan origination system 119 handling a request transmitted by the mortgage loan origination system 116 for the applicant to obtain a selected non-mortgage loan product.

Beginning at box 603, the non-mortgage loan origination system 119 can obtain a request from the mortgage loan origination system 116 for the applicant to obtain a selected non-mortgage loan product. In some embodiments, the request can be an API call that was sent by the mortgage loan origination system 116 at box 406 in FIG. 4.

At box 606, the non-mortgage loan origination system 119 can obtain loan application data 153. The loan application data 153 can include, for example, data representing the applicant's name, address, Social Security number, and a description of the loan for which the applicant is applying. In some embodiments, the non-mortgage loan origination system 119 can obtain the loan application data 153 from the mortgage loan origination system 116. In other embodiments, the non-mortgage loan origination system 119 can request a user to provide at least some of the loan application data 153 through the client device 106.

The non-mortgage loan origination system 119 can also obtain credit report data 156 for the applicant, as indicated at box 609. In some embodiments, the credit report data 156 can be provided by the mortgage loan origination system 116. In other embodiments, the credit report data 156 can be obtained from one or more credit bureau computing systems 109. Alternatively, the non-mortgage loan origination system 119 can use the same credit report data 156 previously stored when the non-mortgage loan origination system 119 determined the non-mortgage loan products for which the applicant qualified.

At box 613, the non-mortgage loan underwriting engine 136 of the non-mortgage loan origination system 119 can compare the credit report data 156 to the non-mortgage loan underwriting criteria 139 to determine whether the applicant is approved for the non-mortgage loan product.

If the applicant is approved for the non-mortgage loan product, as indicated at box 616, the non-mortgage loan origination system 119 can transmit an approval notification to the mortgage loan origination system 116, as shown at box 619. Alternatively, if the applicant is denied the loan product, the non-mortgage loan origination system 119 can transmit a denial notification to the mortgage loan origination system 116, as shown at box 623. Thereafter, the process can end.

With reference to FIG. 7, shown is an illustration of an example of a user interface 703 that can be encoded and transmitted by the mortgage loan underwriting engine 126 and rendered by a client device 106. The example user interface shown in FIG. 7 can be encoded and rendered after the mortgage loan origination system 116 has determined the mortgage loan products for which the applicant qualifies and determined the mortgage loan products for which the applicant would qualify if the applicant obtains a particular non-mortgage loan product.

The user interface 703 shown in FIG. 7 includes a first region 706, which includes information relating to the mortgage loan products for which the applicant qualifies. In the example shown in FIG. 7, the mortgage loan origination system 116 determined that the applicant qualifies for three mortgage loan products having a 30-year term, as indicated in the first region 706.

The depicted user interface 703 also includes a second region 709, which includes information relating to the mortgage loan products for which the applicant would qualify if the applicant obtained a particular non-mortgage loan product. In the example shown in FIG. 7, the mortgage loan origination system 116 determined that the applicant would qualify for three mortgage loan products having a 30-year term, as indicated in the second region 709, if the applicant were to refinance the applicant's existing auto loan.

Additionally, the user interface 703 includes a third region 713, which includes information regarding the non-mortgage loan opportunity for which the applicant qualifies. In this example, the mortgage loan origination system 116 determined that the applicant would qualify for an auto refinance loan, as indicated in the third region 713 of the user interface 703. Additionally, the third region 713 includes a button 716 that, if selected by a user, can cause the mortgage loan origination system 116 to initiate the loan application process for the auto refinance loan.

The user interface 703 also includes a fourth region 719, which includes information regarding anticipated changes to the applicant's credit report data 156 that would occur if the applicant obtained the non-mortgage loan product represented in the third region 713 of the user interface 703. In this case, the mortgage loan origination system 116 has determined that the applicant's credit score would increase by approximately 5 points and the applicant's debt-to-income ratio would decrease by approximately 4%, if the applicant were to obtain the auto refinance loan.

The flowcharts of FIGS. 3A-3B and 4-6 show examples of the functionality and operation of various implementations of portions of the mortgage loan origination system 116 and the non-mortgage loan origination system 119. If embodied in software, each box may represent a module, segment, or portion of code that comprises program instructions to implement the specified logical function(s). The program instructions may be embodied in the form of source code that comprises human-readable statements written in a programming language or machine code that comprises instructions recognizable by a suitable execution system such as a processor in a computer system. The machine code may be converted from the source code. If embodied in hardware, each box may represent a circuit or multiple circuits to implement the specified logical functions.

Although the flowcharts of FIGS. 3A-3B and 4-6 depict a specific order of execution, the order of execution may differ from that which is depicted. For example, the order of execution of two or more boxes can be switched relative to the order shown. Also, two or more boxes shown in succession in FIGS. 3A-3B and 4-6 can be executed concurrently or with partial concurrence. Further, in some embodiments, one or more of the boxes shown in FIGS. 3A-3B and 4-6 can be skipped or omitted. In addition, any number of counters, state variables, warning semaphores, or messages can be added to the logical flow described herein, for purposes of enhanced utility, accounting, performance measurement, or providing troubleshooting aids, etc. All such variations are within the scope of the present disclosure.

Also, any logic, component, system, or application described herein that comprises software or code can be embodied in any non-transitory computer-readable medium for use by or in connection with an instruction execution system such as, for example, a processor in a computer system. The logic can comprise, for example, statements including instructions and declarations that can be fetched from the computer-readable medium and executed by the instruction execution system. In the context of the present disclosure, a "computer-readable medium" can be any medium that can contain, store, or maintain the logic, component, system, or application described herein for use by or in connection with the instruction execution system.

The computer-readable medium can comprise any one of many physical media such as, for example, magnetic, optical, or semiconductor media. More specific examples of a suitable computer-readable medium can include, but are not limited to, magnetic tapes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic, component, system, or application described herein can be implemented and structured in a variety of ways. For example, one or more systems described herein can be implemented as modules or components of a single application. Further, any logic, component, system, or application described herein may be executed in shared or separate computing devices or a combination thereof.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Therefore, the following is claimed:

1. A mortgage loan origination system, comprising:
at least one computing device;
a plurality of computer instructions executable by the at least one computing device, wherein the plurality of computer instructions, when executed by the at least one computing device, are configured to cause the at least one computing device to at least:
enable a non-mortgage loan origination computing system to process a data transfer request from a mortgage loan origination computing system while complying with an access policy restricting a user of the mortgage loan origination computing system from accessing the non-mortgage loan origination computing system;
transmit at least one first application programming interface (API) call to a credit reporting system to obtain credit report data for a mortgage loan applicant;
determine that the mortgage loan applicant does not qualify for a mortgage loan product based at least in part on inputting the credit report data obtained from the credit reporting system into a mortgage loan underwriting engine of the mortgage loan origination computing system;
transmit at least one second API call to the non-mortgage loan origination computing system to obtain data representing a non-mortgage loan product for which the mortgage loan applicant qualifies based at least in part on the credit report data;
generate a modified version of the credit report data for the mortgage loan applicant based at least in part on the non-mortgage loan product;
determine that the mortgage loan applicant would qualify for the mortgage loan product based at least in part on the modified version of the credit report data; and
encode at least one user interface comprising a notification that the mortgage loan applicant would qualify for the mortgage loan product if the mortgage loan applicant obtained the non-mortgage loan product.

2. The mortgage loan origination system of claim 1, wherein the at least one API call to the non-mortgage loan origination computing system comprises a parameter for the non-mortgage loan origination computing system to use to obtain the credit report data from the credit reporting system.

3. The mortgage loan origination system of claim 1, wherein the plurality of computer instructions are further configured to cause the at least one computing device to determine that the mortgage loan applicant does not qualify for the mortgage loan product based at least in part on the credit report data by at least:
inputting the credit report data into an automated underwriting engine that compares the credit report data with predefined underwriting criteria.

4. The mortgage loan origination system of claim 1, wherein the plurality of computer instructions are further configured to cause the at least one computing device to determine that the mortgage loan applicant qualifies for the mortgage loan product based at least in part on the modified version of the credit report data by at least:
inputting the modified version of the credit report data into an automated underwriting engine that at least compares the credit report data with predefined underwriting criteria.

5. The mortgage loan origination system of claim 1, wherein the at least one API call to the credit reporting system comprises loan application data that the credit reporting system uses to obtain the credit report data.

6. The mortgage loan origination system of claim 1, wherein the computer instructions are further configured to cause the at least one computing device to generate the modified version of the credit report data based at least in part on the non-mortgage loan product by at least:
replacing data representing an existing non-mortgage loan product in the credit report data with data corresponding to the non-mortgage loan product represented in the data obtained from the non-mortgage loan origination computing system.

7. The mortgage loan origination system of claim 1, wherein the mortgage loan origination computing system is partitioned from the non-mortgage loan origination computing system.

8. The mortgage loan origination system of claim 7, wherein the mortgage loan origination computing system implements a first access policy, and wherein the non-mortgage loan origination computing system implements a second access policy, wherein the access policy comprises the first access policy.

9. The mortgage loan origination system of claim 1, wherein the plurality of computer instructions are further configured to cause the at least one computing device to simulate a result of the mortgage loan underwriting engine if the mortgage loan applicant obtains a plurality of non-mortgage loan products identified by the non-mortgage loan origination computing system.

10. A non-transitory computer-readable medium embodying a plurality of computer instructions executable by at least one computing device, the plurality of computer instructions being configured to cause the at least one computing device to at least:
enable a non-mortgage loan origination computing system to process a data transfer request from a mortgage loan origination computing system while complying with an access policy restricting a user of the mortgage loan origination computing system from accessing the non-mortgage loan origination computing system
obtain, from a credit reporting system, credit report data for a mortgage loan applicant;
determine that the mortgage loan applicant does not qualify for a mortgage loan product based at least in part on inputting the credit report data obtained from the credit reporting system into a mortgage loan underwriting engine of the mortgage loan origination computing system;
obtain data representing a non-mortgage loan product for which the mortgage loan applicant qualifies based at least in part on the credit report data;
generate a modified version of the credit report data for the mortgage loan applicant based at least in part on the non-mortgage loan product;
determine that the mortgage loan applicant would qualify for the mortgage loan product based at least in part on inputting the modified version of the credit report data into the mortgage loan underwriting engine of the mortgage loan origination computing system; and generate a user interface that identifies the non-mortgage loan product, the user interface further comprising a user interface item that, when selected, is configured to initiate an application for the non-mortgage loan product.

11. The non-transitory computer-readable medium of claim 10, wherein the plurality of computer instructions are further configured to cause the at least one computing device to at least obtain the data representing the non-mortgage loan product from a non-mortgage loan origination computing system that is partitioned from the mortgage loan origination computing system.

12. The non-transitory computer-readable medium of claim 10, wherein the plurality of computer instructions are configured to execute in the mortgage loan origination computing system that is partitioned from a non-mortgage loan origination computing system.

13. The non-transitory computer-readable medium of claim 10, wherein the computer instructions are further configured to cause the at least one computing device to determine that the mortgage loan applicant does not qualify for the mortgage loan product based at least in part on the credit report data by at least:
inputting the credit report data into an automated underwriting engine that compares the credit report data with predefined underwriting criteria.

14. The non-transitory computer-readable medium of claim 10, wherein the mortgage loan underwriting engine compares the credit report data with predefined underwriting criteria.

15. The non-transitory computer-readable medium of claim 10, wherein the computer instructions are further configured to cause the at least one computing device to generate the modified version of the credit report data based at least in part on the non-mortgage loan product by at least:
replacing data representing an existing non-mortgage loan product represented in the credit report data with data corresponding to the non-mortgage loan product represented in the data obtained from the non-mortgage loan origination computing system.

16. The non-transitory computer-readable medium of claim 10, wherein the plurality of computer instructions are configured to simulate a result of the mortgage loan underwriting engine if the mortgage loan applicant obtains a plurality of non-mortgage loan products identified by the non-mortgage loan origination computing system.

17. A method, comprising:
enabling, by at least one loan origination computing system, a first loan origination computing system to process a data transfer request from a second loan origination computing system while complying with an access policy restricting a user of the first loan origination computing system from accessing the second loan origination computing system;
obtaining, by the at least one loan origination computing system, credit report data for a loan applicant;
determining, by the at least one loan origination computing system, that the loan applicant does not qualify for a first loan product based at least in part on inputting the credit report data into a loan underwriting engine of the first loan origination computing system;
obtaining, by the at least one loan origination computing system, data representing a second loan product for which the loan applicant would qualify, the second loan product being a different type of loan product than the first loan product;
generating, by the at least one loan origination computing system, a modified version of the credit report data for the loan applicant based at least in part on the second loan product;
determining, by the at least one loan origination computing system, that the loan applicant would qualify for the first loan product based at least in part on inputting the modified version of the credit report data into the loan underwriting engine of the first loan origination computing system; and
generating, by the at least one loan origination computing system, a user interface that identifies the second loan product, the user interface further comprising a user interface item that, when selected, is configured to initiate an application for the second loan product.

18. The method of claim 17, wherein:
the first loan origination computing system obtains the credit report data for the loan applicant;
the first loan origination computing system determines that the loan applicant does not qualify for the first loan product based at least in part on the credit report data;
the first loan origination computing system obtains from a second loan origination system the data representing the second loan product for which the loan applicant would qualify;
the first loan origination computing system generates the modified version of the credit report data for the loan applicant based at least in part on the second loan product; and
the first loan origination computing system determines that the loan applicant would qualify for the first loan product based at least in part on the modified version of the credit report data.

19. The method of claim 18, wherein:
the first loan origination computing system is a mortgage loan origination computing system; and
the second loan origination computing system is a non-mortgage loan origination computing system that is partitioned from the mortgage loan origination computing system.

20. The method of claim 18, wherein obtaining the data representing the second loan product for which the loan applicant would qualify comprises transmitting an API call to the second loan origination computing system, the API call comprising a unique identifier for the credit report data for the loan applicant.

21. The method of claim 17, wherein obtaining the credit report data for the loan applicant comprises transmitting an API call to a credit reporting engine.

22. The method of claim 17, further comprising, simulating, by the at least one loan origination computing system, a result of the loan underwriting engine if the loan applicant obtains a plurality of second loan products identified by the second loan origination computing system.

* * * * *